United States Patent
Kobayashi et al.

(10) Patent No.: US 12,181,023 B1
(45) Date of Patent: Dec. 31, 2024

(54) PLANETARY GEAR REDUCTION MECHANISM

(71) Applicant: MITSUBA Corporation, Gunma (JP)

(72) Inventors: Motoaki Kobayashi, Gunma (JP); Teppei Tokizaki, Gunma (JP); Tohru Yumoto, Gunma (JP); Nobuyuki Nagai, Gunma (JP)

(73) Assignee: MITSUBA Corporation, Gunma (JP)

( * ) Notice: Subject to any disclaimer, the term of this patent is extended or adjusted under 35 U.S.C. 154(b) by 0 days.

(21) Appl. No.: 18/607,539

(22) Filed: Mar. 17, 2024

(30) Foreign Application Priority Data

Jul. 24, 2023 (JP) .................................. 2023-119728

(51) Int. Cl.
*F16H 57/08* (2006.01)
*F16H 1/28* (2006.01)

(52) U.S. Cl.
CPC ............. *F16H 1/28* (2013.01); *F16H 57/082* (2013.01); *F16H 2001/2872* (2013.01)

(58) Field of Classification Search
CPC ...... F16H 1/36; F16H 1/34; F16H 2025/2087; F16H 2055/0893
See application file for complete search history.

(56) References Cited

U.S. PATENT DOCUMENTS 9,791,026 B2 * 10/2017 Saxstetter ............. E05F 15/622
11,401,998 B2 * 8/2022 Takizawa .................. F16H 1/46

FOREIGN PATENT DOCUMENTS

JP 2003172411 6/2003

* cited by examiner

*Primary Examiner* — Derek D Knight
(74) *Attorney, Agent, or Firm* — JCIPRNET

(57) ABSTRACT

A planetary gear reduction mechanism is capable of accurately driving an object to be driven. A carrier 60 is provided with first and second support shaft fixing holes 64a and 64b to which a support shaft 52 that rotatably supports a planetary gear 50 is fixed, and a shaft coupling 70 is fixed to the carrier 60 by a fixing pin 73 fixed to the second support shaft fixing hole 64b, which allows the shaft coupling 70 to be accurately fixed to the carrier 60 formed with high processing accuracy. Therefore, a planetary gear reduction mechanism 10 is realized, which is capable of accurately driving a drive mechanism of a robot, which is an object to be driven.

6 Claims, 13 Drawing Sheets

PLANETARY GEAR REDUCTION MECHANISM

CROSS-REFERENCE TO RELATED APPLICATION

This application claims the priority benefits of Japanese application no. 2023-119728, filed on Jul. 24, 2023. The entirety of the above-mentioned patent application is hereby incorporated by reference herein and made a part of this specification.

BACKGROUND

Technical Field

The disclosure relates to a planetary gear reduction mechanism having a plurality of gears.

Description of Related Art

For example, Patent Document 1 (Japanese Patent Application Laid-Open No. 2003-172411) describes a planetary gear reducer in which a planetary gear mechanism including a sun gear, a planetary gear, a carrier, and an internal gear is arranged in two stages stacked in the axial direction. As a result, the rotational speed of a motor shaft, which is the input side, is reduced, and a high-torque rotational force is output from an output shaft, which is the output side.

In the technique described in Patent Document 1 above, the output shaft is integrally provided at the rotation center of the carrier, but in order to connect the output shaft and an object to be driven to enable power transmission, a shaft coupling is required between the output shaft and the object to be driven. If the accuracy of attaching the shaft coupling to the output shaft is low, there is a problem that rattling may occur between the shaft coupling and the output shaft, making it impossible to drive the object to be driven with high accuracy.

The disclosure provides a planetary gear reduction mechanism that is capable of accurately driving an object to be driven.

SUMMARY

In one aspect of the disclosure, a planetary gear reduction mechanism having a plurality of gears includes: an input side rotating body connected to a drive source so as to be capable of transmitting power; a sun gear provided on the input side rotating body; an internal gear disposed on a radially outer side of the sun gear; a planetary gear disposed between the sun gear and the internal gear; a planetary carrier rotatably supporting the planetary gear; and an output side rotating body fixed to the planetary carrier and driving an object to be driven. The planetary carrier includes a support shaft fixing hole to which a support shaft that rotatably supports the planetary gear is fixed, and the output side rotating body is fixed to the planetary carrier by a fixing member fixed to the support shaft fixing hole.

According to the disclosure, a planetary gear reduction mechanism that is capable of accurately driving an object to be driven is realized.

DESCRIPTION OF THE EMBODIMENTS

First Embodiment

The first embodiment of the disclosure will be described in detail below with reference to the drawings.

Figure 1:
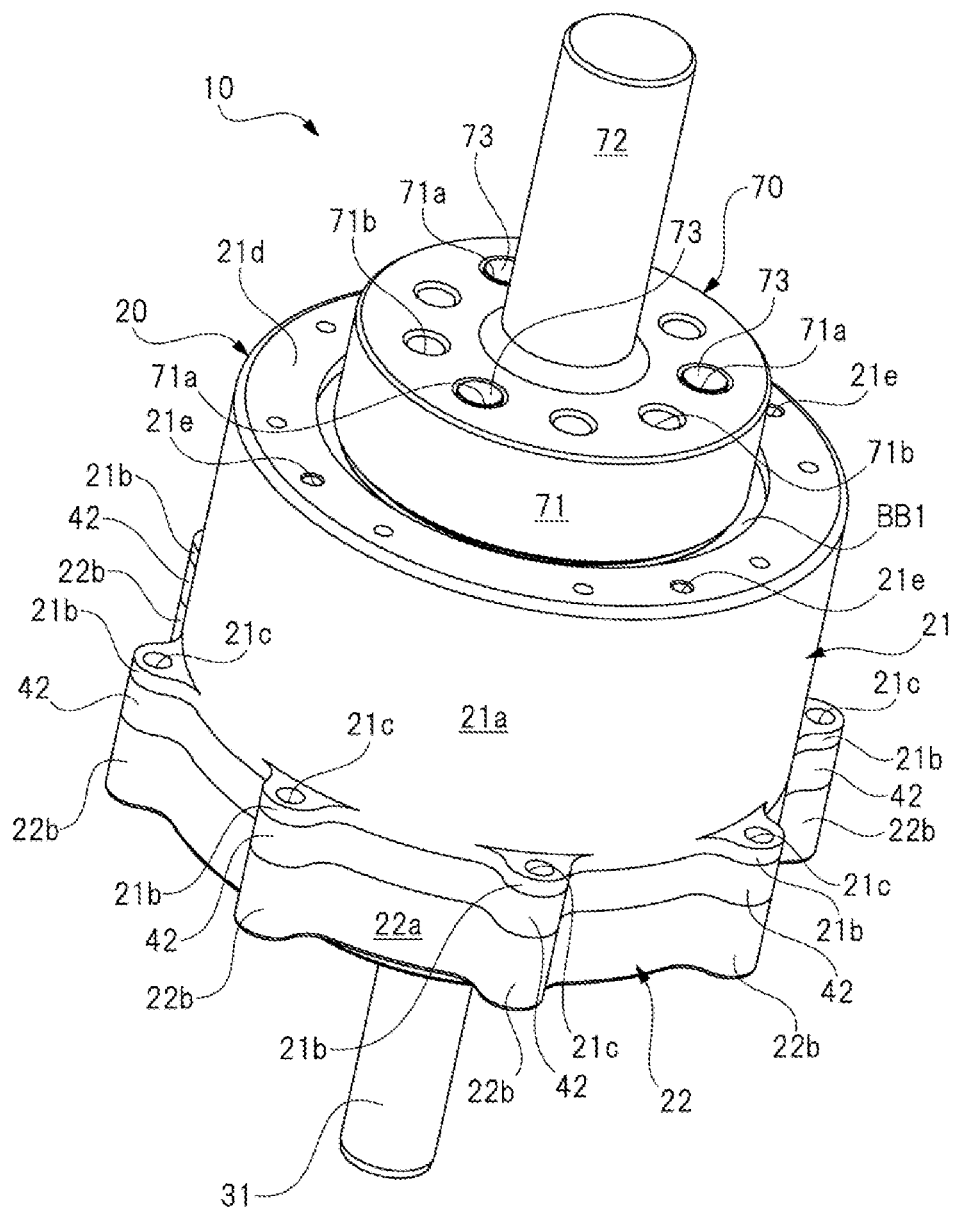
FIG. 1 is a perspective view of the planetary gear reduction mechanism viewed from the output side.
Figure 2:
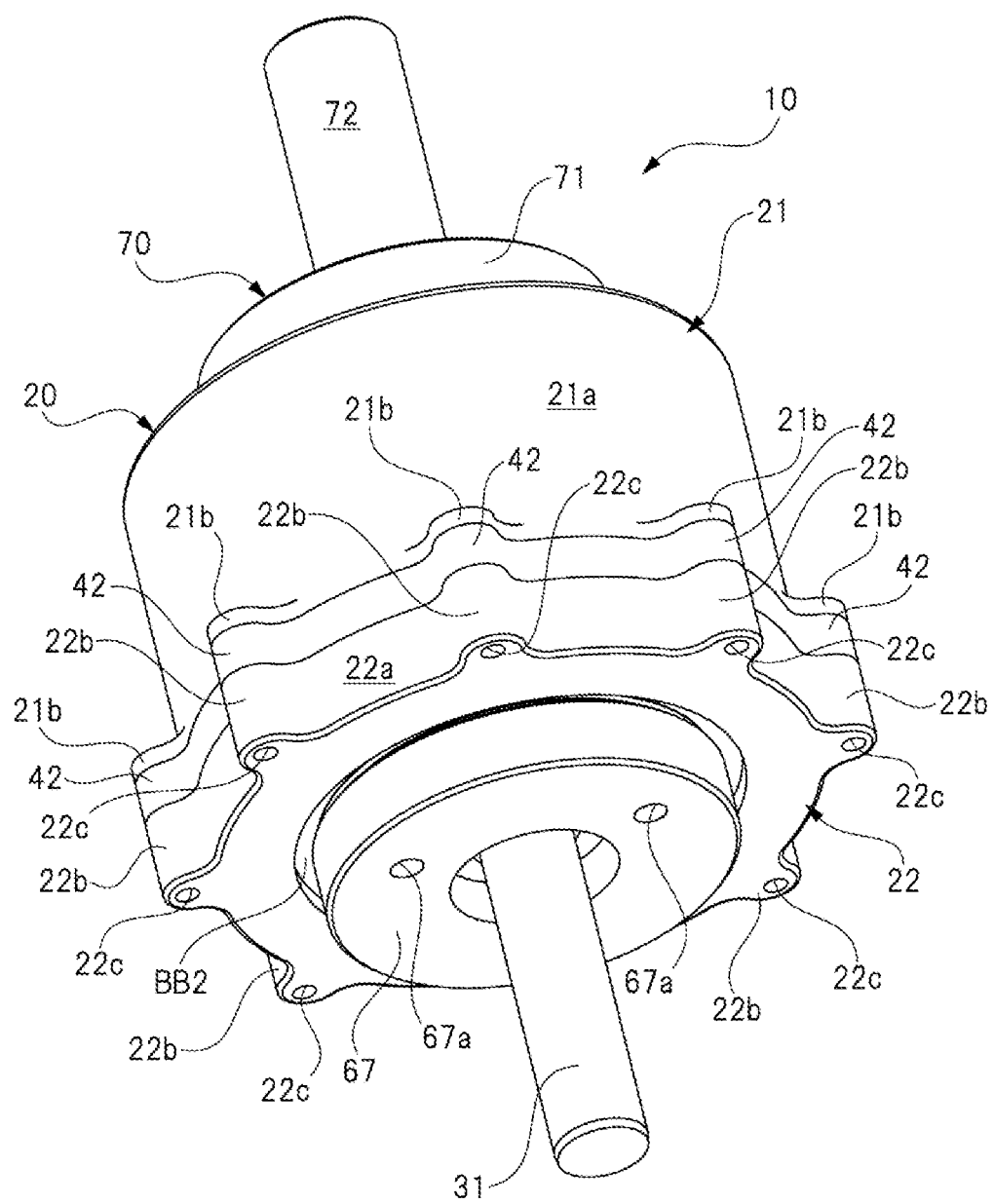
FIG. 2 is a perspective view of the planetary gear reduction mechanism viewed from the input side.
Figure 3:
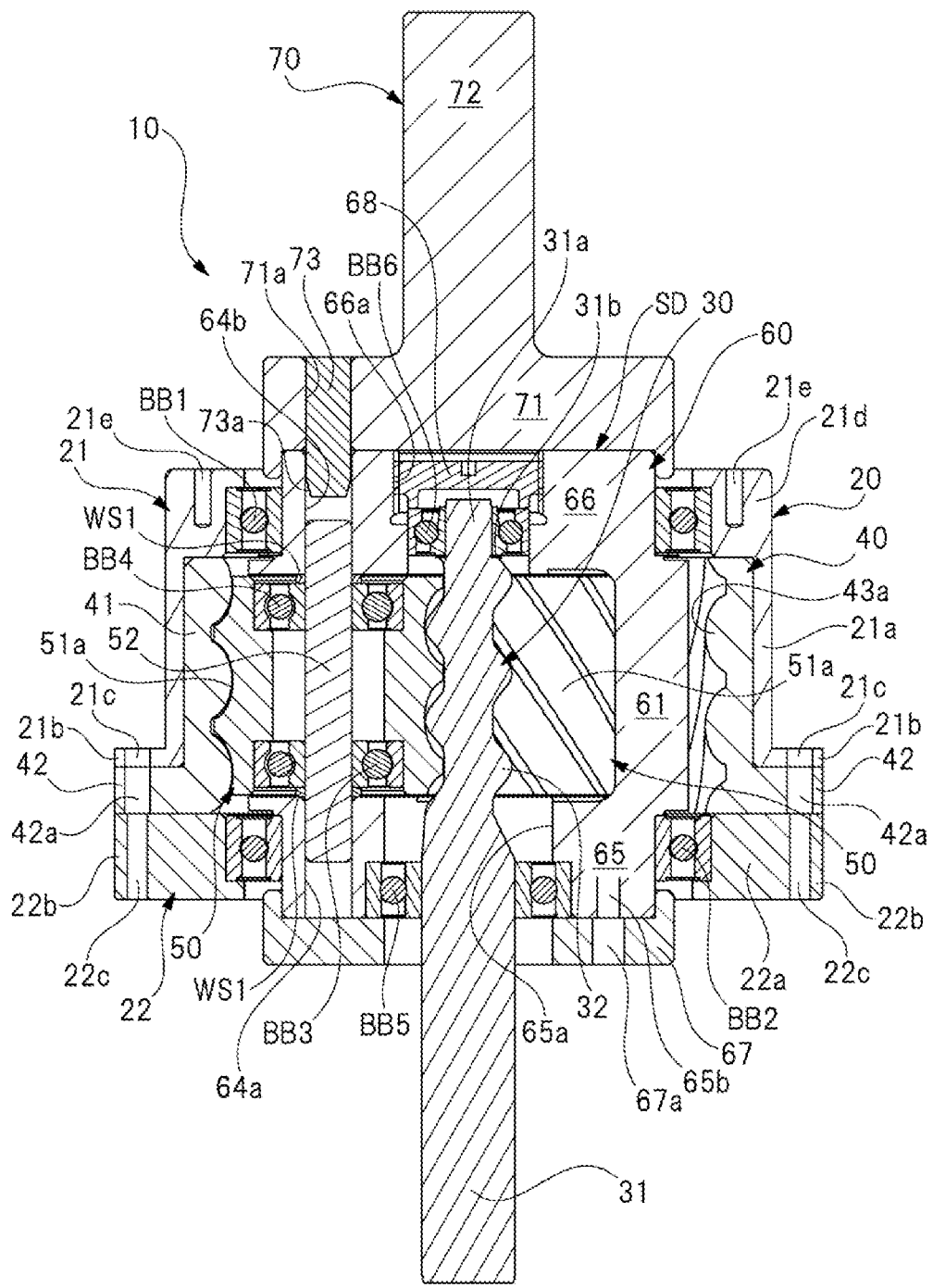
FIG. 3 is a cross-sectional view showing the internal structure of the planetary gear reduction mechanism in FIG. 1.
Figure 4:
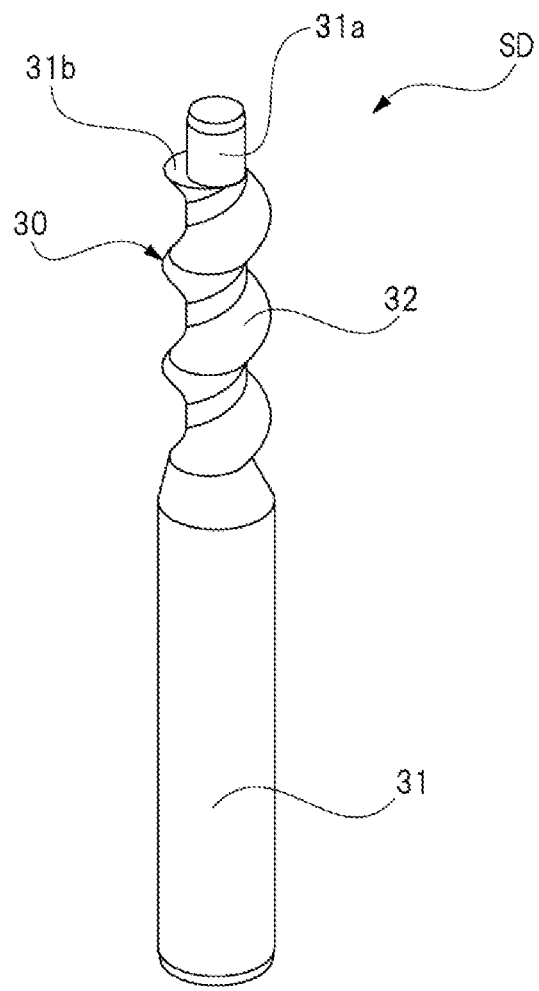
FIG. 4 is a perspective view showing the pinion gear alone.
Figure 5:
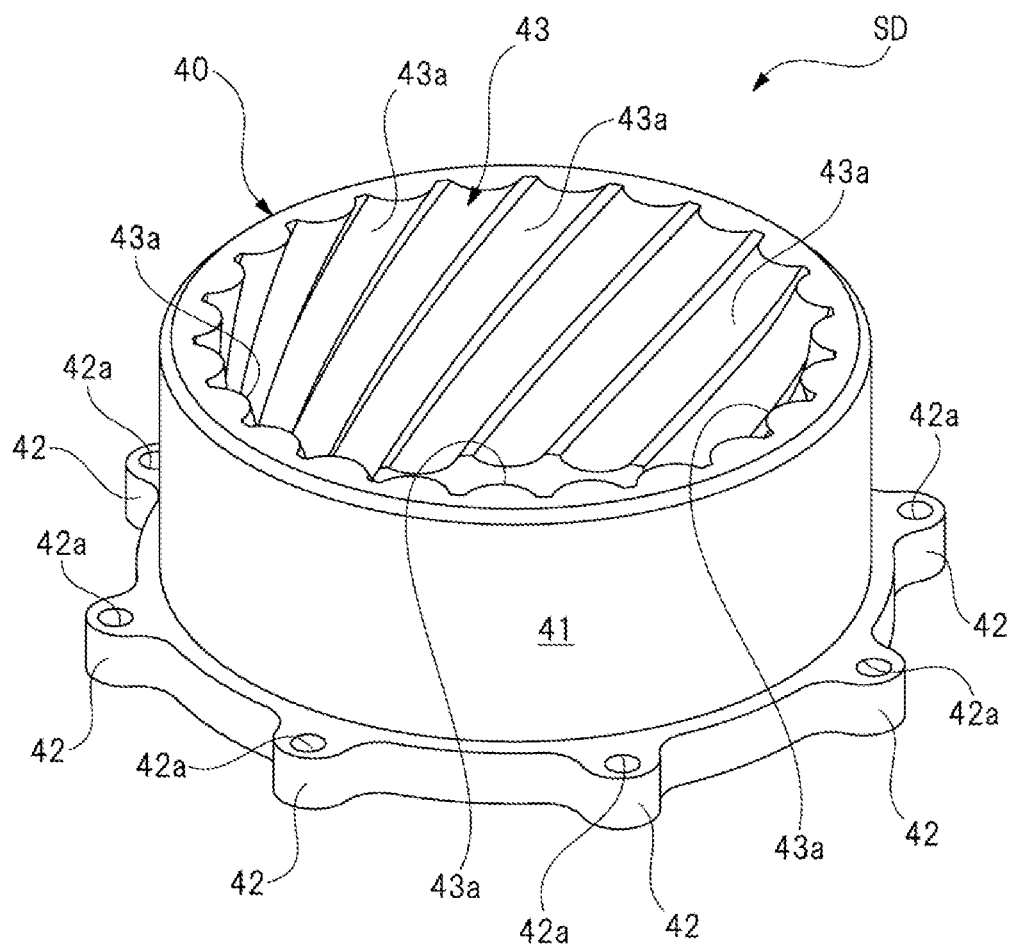
FIG. 5 is a perspective view showing the internal gear alone.
Figure 6:
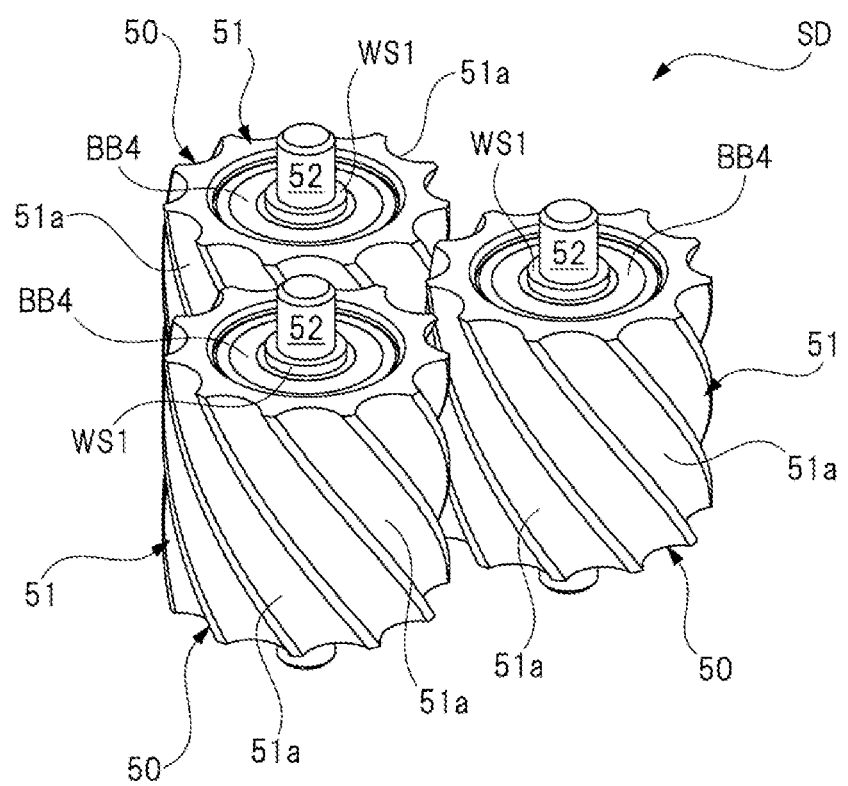
FIG. 6 is a perspective view showing three helical gears.
Figure 7:
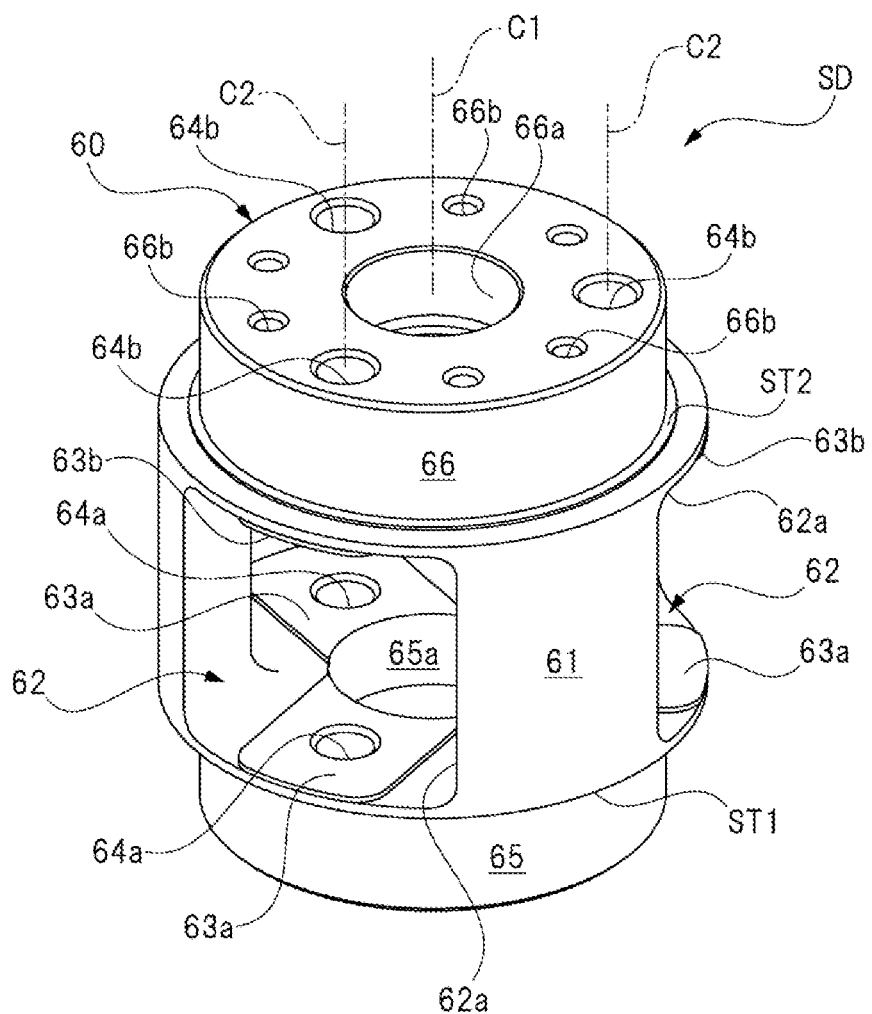
FIG. 7 is a perspective view showing the carrier alone.

FIG. 1 is a perspective view of the planetary gear reduction mechanism viewed from the output side, FIG. 2 is a perspective view of the planetary gear reduction mechanism viewed from the input side, FIG. 3 is a cross-sectional view showing the internal structure of the planetary gear reduction mechanism in FIG. 1, FIG. 4 is a perspective view showing the pinion gear alone, FIG. 5 is a perspective view showing the internal gear alone, FIG. 6 is a perspective view showing three helical gears, and FIG. 7 is a perspective view showing the carrier alone.

[Overview of the Planetary Gear Reduction Mechanism]

A planetary gear reduction mechanism 10 shown in FIG. 1 to FIG. 3 is used, for example, to drive the joints of a robot. Further, an electric motor (not shown), which is a drive source, is provided on the input side (lower side in the drawing) of the planetary gear reduction mechanism 10 so as to be capable of transmitting power, and a drive mechanism (not shown) of a robot, which is an object to be driven, is provided on the output side (upper side in the drawing) of the planetary gear reduction mechanism 10 so as to be capable of transmitting power.

More specifically, an input shaft 31 of the planetary gear reduction mechanism 10 is rotated by the electric motor, and an output shaft 72 of the planetary gear reduction mechanism 10 drives the drive mechanism of the robot. The planetary gear reduction mechanism 10 then decelerates the rotation of the input shaft 31 to increase the torque, and outputs a rotational force with increased torque from the output shaft 72.

Thereby, the planetary gear reduction mechanism 10 is capable of transmitting large drive torque to the drive mechanism of the robot even if the drive source is a small electric motor. Thus, the electric motor can be made small and can be easily installed inside a robot arm or the like that has a small installation space.

It should be noted that the planetary gear reduction mechanism 10 according to this embodiment is not limited to use for driving the joints of a robot and can also be applied to, for example, small vehicle-mounted drive systems, e.g. power sliding door devices and power window devices mounted on vehicles such as automobiles.

[Housing]

The planetary gear reduction mechanism 10 includes a housing 20 that forms an outer shell of the planetary gear reduction mechanism 10. The housing 20 includes a housing body 21 that is formed in a substantially cylindrical shape, and a ring member 22 that is mounted on one axial side (lower side in the drawing) of the housing body 21 and is formed in an annular shape. The housing body 21 and the ring member 22 are both made of aluminum, thereby reducing the overall weight of the planetary gear reduction mechanism 10.

The housing body 21 includes a cylindrical portion 21a that extends in the axial direction of the planetary gear reduction mechanism 10, and a total of eight first flange portions 21b that are integrally provided on one axial side of the cylindrical portion 21a and protrude toward the radially outer side of the cylindrical portion 21a. Further, a total of eight first flange portions 21b are each provided with an insertion hole 21c into which a fixing bolt (not shown) is inserted.

On the other hand, an annular second flange portion 21d is integrally provided on the other axial side (upper side in the drawing) of the cylindrical portion 21a so as to protrude toward the radially inner side of the cylindrical portion 21a. Further, the outer ring (outer race) of a first ball bearing BB1 is mounted on the radially inner side of the second flange portion 21d. In addition, one axial side (lower side in the drawing) of the second flange portion 21d supports the other axial side (upper side in the drawing) of an internal gear 40.

Thus, the second flange portion 21d of the housing body 21 has a function of supporting both the first ball bearing BB1 and the internal gear 40.

Here, the first ball bearing BB1 rotatably supports the other axial side (upper side in the drawing) of a carrier 60, and specifically, the inner ring (inner race) of the first ball bearing BB1 is mounted on the outer peripheral portion of an output side cylindrical portion 66 (see FIG. 7) that forms the carrier 60.

Further, a plurality of screw holes 21e are provided on the other axial side (upper side in the drawing) of the second flange portion 21d. Further, fixing screws (not shown) for fixing the planetary gear reduction mechanism 10 to an internal fixing portion (not shown) such as a robot arm are screwed into these screw holes 21e.

The ring member 22 includes an annular body 22a. A total of eight third flange portions 22b are integrally provided on the annular body 22a so as to protrude toward the radially outer side thereof. These third flange portions 22b are provided corresponding to the first flange portions 21b of the housing body 21. Each third flange portion 22b is provided with a female screw hole 22c into which a fixing bolt (not shown) is screwed.

It should be noted that a total of eight fourth flange portions 42 provided on the internal gear 40 are held between the first flange portions 21b and the third flange portions 22b forming the housing 20 in the axial direction of the housing 20. As a result, a fixing bolt (not shown) is inserted into the insertion hole 21c of the first flange portion 21b and an insertion hole 42a of the fourth flange portion 42 and screwed into the female screw hole 22c of the third flange portion 22b, thereby housing and fixing a speed reducer SD inside the housing 20.

Furthermore, the outer ring (outer race) of a second ball bearing BB2 is mounted on the radially inner side of the ring member 22. That is, the ring member 22 has a function of supporting the second ball bearing BB2 and fixing the internal gear 40 inside the housing 20.

Here, the second ball bearing BB2 rotatably supports one axial side (lower side in the drawing) of the carrier 60, and specifically, the inner ring (inner race) of the second ball bearing BB2 is mounted on the outer peripheral portion of an input side cylindrical portion 65 (see FIG. 7) that forms the carrier 60.

In addition, a total of four positioning protrusions P (see FIG. 10) are integrally provided on the other axial side (upper side in the drawing) of the ring member 22. These positioning protrusions P protrude toward the internal gear 40 in the axial direction of the ring member 22, and are engaged with engagement recesses (not shown) of the internal gear 40. Thereby, the ring member 22 can be easily positioned with respect to the internal gear 40 (improved assemblability).

It should be noted that the first ball bearing BB1 and the second ball bearing BB2 that respectively support both axial sides of the carrier 60 are ball bearings of the same size and specifications. Moreover, the first and second ball bearings BB1 and BB2 are the largest ball bearings among the ball bearings provided in the planetary gear reduction mechanism 10.

[Overview of the Speed Reducer]

As shown in FIG. 3 to FIG. 7, the planetary gear reduction mechanism 10 includes a plurality of gears. Specifically, the speed reducer SD housed inside the housing 20 includes one pinion gear 30, one internal gear 40, a total of three planetary gears 50, and the carrier 60 that holds these planetary gears 50. In other words, the speed reducer SD is a planetary speed reducer.

[Pinion Gear]

As shown in FIG. 3 and FIG. 4, the pinion gear 30 is integrally provided on the other axial side (upper side in the drawing) of the input shaft 31. Further, a rotating shaft (not shown) of the electric motor serving as a drive source is connected to one axial side (lower side in the drawing) of the input shaft 31 so as to be capable of transmitting power. As a result, the pinion gear 30 is rotated in a predetermined rotation direction at a predetermined rotational speed as the electric motor rotates.

It should be noted that the input shaft 31 corresponds to the input side rotating body in the disclosure. Further, the pinion gear 30 corresponds to the sun gear in the disclosure.

A spiral tooth 32 is integrally provided on the outer peripheral portion of the pinion gear 30. The axial length of the pinion gear 30 (spiral tooth 32) is slightly greater than the axial length of the planetary gear 50. Thereby, the spiral tooth 32 can reliably mesh with the planetary gear 50.

It should be noted that the spiral tooth 32 corresponds to one tooth in the disclosure.

The spiral tooth 32 is spirally connected in the axial direction of the pinion gear 30, and the pinion gear 30 is provided with only one spiral tooth 32. That is, the number of teeth of the pinion gear 30 is "1". Further, the cross-sectional shape of the spiral tooth 32 is substantially semicircular, and the spiral tooth 32 fits into (meshes with) a meshing recess 51a (see FIG. 6) of the planetary gear 50.

By setting the number of teeth of the pinion gear 30 to "1" in this way, the gear transmission efficiency is increased and a large reduction ratio is obtained despite the small size.

Therefore, it is possible to downsize and save power of the electric motor which is a drive source.

[Internal Gear]

As shown in FIG. 3 and FIG. 5, the internal gear 40 is fixed to the radially inner side of the cylindrical portion 21a that forms the housing body 21. Specifically, the internal gear 40 is held by the housing body 21 and the ring member 22 in the axial direction of the planetary gear reduction mechanism 10. Further, the internal gear 40 includes a cylindrical body 41 that is formed in a substantially cylindrical shape, and a total of eight fourth flange portions 42 that protrude toward the radially outer side of the cylindrical body 41 on one axial side of the cylindrical body 41.

The cylindrical body 41 is arranged on the radially outer side of the pinion gear 30, and a gear forming portion 43 is provided on the radially inner side of the cylindrical body 41. The gear forming portion 43 of the cylindrical body 41 is integrally provided with a plurality of internal teeth 43a having a substantially semicircular cross-sectional shape, similar to the spiral tooth 32 of the pinion gear 30. Here, the plurality of internal teeth 43a are inclined at a predetermined angle with respect to the axial direction of the cylindrical body 41 so as to mesh with the meshing recesses 51a (see FIG. 6) of the planetary gear 50.

It should be noted that the internal gear 40 corresponds to the internal gear in the disclosure.

In addition, the fourth flange portions 42 provided on the internal gear 40 are provided corresponding to the first flange portions 21b of the housing body 21 and the third flange portions 22b of the ring member 22. Further, a total of eight fourth flange portions 42 are each provided with an insertion hole 42a into which a fixing bolt (not shown) is inserted.

Thereby, the fourth flange portions 42 are held between the first flange portions 21b and the third flange portions 22b, and consequently, the internal gear 40 is securely fixed without rattling in both the axial direction and the circumferential direction of the housing 20.

[Planetary Gear]

As shown in FIG. 3 and FIG. 6, a total of three planetary gears 50 are arranged between the pinion gear 30 and the internal gear 40 in the radial direction of the planetary gear reduction mechanism 10. The planetary gears 50 are arranged at equal intervals (120 degree intervals) with respect to the circumferential direction of the pinion gear 30 and the internal gear 40, and are meshed with both the pinion gear 30 and the internal gear 40.

It should be noted that the planetary gear 50 corresponds to the planetary gear in the disclosure.

The planetary gear 50 is formed in a substantially cylindrical shape, and a gear forming portion 51 is provided on the radially outer side thereof. A plurality of meshing recesses 51a are provided in the gear forming portion 51 of the planetary gear 50 side by side in the circumferential direction. These meshing recesses 51a are inclined at a predetermined angle with respect to the axial direction of the planetary gear 50, and as a result, the spiral tooth 32 of the pinion gear 30 and the internal teeth 43a of the internal gear 40 can fit into and mesh with the meshing recesses 51a.

Here, the planetary gear 50 has the meshing recesses 51a that are inclined with respect to the axial direction of the planetary gear 50, and can also be called a helical gear.

Thus, each planetary gear 50 is rolled between the pinion gear 30 rotated by the electric motor (not shown) and the internal gear 40 fixed to the housing 20. It should be noted that the meshing recess 51a of the planetary gear 50 is recessed with a substantially semicircular cross-sectional shape.

A third ball bearing BB3 and a fourth ball bearing BB4 are provided on the radially inner side of the planetary gear 50. Specifically, the third ball bearing BB3 is provided on one axial side (lower side in the drawing) of the planetary gear 50, and the fourth ball bearing BB4 is provided on the other axial side (upper side in the drawing) of the planetary gear 50. Further, the outer rings (outer races) of the third and fourth ball bearings BB3 and BB4 are mounted on the radially inner side of the planetary gear 50.

These third and fourth ball bearings BB3 and BB4 are ball bearings of the same size and specifications, respectively. In addition, the third and fourth ball bearings BB3 and BB4 are ball bearings smaller than the first and second ball bearings BB1 and BB2 that rotatably support the carrier 60.

A total of three planetary gears 50 are rotatably supported by support shafts 52, respectively. Specifically, the support shafts 52 are inserted into the inner rings (inner races) of the third and fourth ball bearings BB3 and BB4 mounted on the planetary gears 50 when assembling a carrier assembly CA (see FIG. 9). Further, both axial sides of the support shaft 52 are fixed to first and second support shaft fixing holes 64a and 64b provided in the carrier 60, respectively.

It should be noted that first washers WS1 are provided on one axial side of the third ball bearing BB3 (lower side in the drawing) and on the other axial side of the fourth ball bearing BB4 (upper side in the drawing). As a result, the planetary gear 50 on which the third and fourth ball bearings BB3 and BB4 are mounted can rotate smoothly with respect to the carrier 60 and the support shaft 52 without rattling.

[Carrier]

As shown in FIG. 3 and FIG. 7, the carrier 60 is formed in a substantially cylindrical shape by cutting an aluminum material. The carrier 60 includes a cylindrical body portion 61, and a total of three gear support portions 62 are provided in the cylindrical body portion 61. Each gear support portion 62 has a function of rotatably supporting the planetary gear 50.

Here, the carrier 60 rotatably supports a total of three planetary gears 50, and corresponds to the planetary carrier in the disclosure.

The gear support portions 62 are provided at equal intervals (120 degree intervals) in the circumferential direction of the cylindrical body portion 61, and include communication holes 62a that communicate the radially inner side and the radially outer side of the cylindrical body portion 61. The communication hole 62a is formed in a substantially square shape when the carrier 60 is viewed from a side. Further, the planetary gear 50 is rotatably housed in the communication hole 62a with a small gap therebetween.

It should be noted that the carrier 60 is one of the components that require particularly high processing accuracy among the components forming the planetary gear reduction mechanism 10 in order to rotate the planetary gears 50 smoothly without rattling.

Furthermore, first and second pedestals 63a and 63b are provided on both sides of the communication holes 62a in the axial direction of the carrier 60 to support both axial sides of the planetary gears 50. Specifically, the first pedestal 63a is arranged on one axial side of the carrier 60 (lower side in the drawing), and the second pedestal 63b is arranged on the other axial side of the carrier 60 (upper side in the drawing). Further, the first washers WS1 provided on both axial sides of the planetary gears 50 are in contact with the first and second pedestals 63a and 63b, respectively.

The input side cylindrical portion 65 having a smaller diameter than the cylindrical body portion 61 is provided on one axial side of the carrier 60. An insertion hole 65a through which the input shaft 31 (pinion gear 30) is inserted is provided on the radially inner side of the input side cylindrical portion 65, and a fifth ball bearing BB5 that rotatably supports the input shaft 31 is installed in the insertion hole 65a. Specifically, the outer ring (outer race) of the fifth ball bearing BB5 is installed in the insertion hole 65a.

It should be noted that the inner ring (inner race) of the fifth ball bearing BB5 is fixed to the substantially central portion of the input shaft 31 in the axial direction (near the pinion gear 30) by press fitting. Here, one axial side of the input side cylindrical portion 65 is covered with a lid member 67 formed in a substantially disk shape. The lid member 67 has a function of preventing the fifth ball bearing BB5 from falling off from the input side cylindrical portion 65. In other words, the lid member 67 has a function of preventing the input shaft 31 to which the fifth ball bearing BB5 is fixed from coming out of the carrier 60.

Further, a total of three screw insertion holes 67a (see FIG. 11) are provided in the lid member 67, and a total of three screw holes 65b are provided on one axial side of the input side cylindrical portion 65. It should be noted that fixing screws (not shown) for fixing the lid member 67 to the input side cylindrical portion 65 are screwed into a total of three screw holes 65b.

In addition, the inner ring of the second ball bearing BB2 is mounted on the radially outer side of the input side cylindrical portion 65, and the inner ring of the second ball bearing BB2 is abutted against a first stepped portion ST1 (see FIG. 7) between the cylindrical body portion 61 and the input side cylindrical portion 65 from one axial side.

Furthermore, the first support shaft fixing hole 64a is provided at a location of the input side cylindrical portion 65 where the first pedestal 63a is provided so as to extend in the axial direction of the carrier 60. Three first support shaft fixing holes 64a are provided corresponding to the first pedestals 63a, and are arranged at equal intervals (120 degree intervals) in the circumferential direction of the cylindrical body portion 61. Further, the first support shaft fixing hole 64a passes through both the first pedestal 63a and the input side cylindrical portion 65, and one axial side (lower side in the drawing) of the support shaft 52 that rotatably supports the planetary gear 50 is installed in the first support shaft fixing hole 64a.

Further, the output side cylindrical portion 66 having the same diameter as the input side cylindrical portion 65 is provided on the other axial side of the carrier 60. A through hole 66a is provided on the radially inner side of the output side cylindrical portion 66, a sixth ball bearing BB6 that rotatably supports the other axial side of the input shaft 31 is installed in the through hole 66a, and a rattling adjustment member 68 is provided to adjust the rattling of the input shaft 31 in the axial direction with respect to the carrier 60.

Specifically, the outer ring (outer race) of the sixth ball bearing BB6 is installed in the through hole 66a. Further, the inner ring (inner race) of the sixth ball bearing BB6 is mounted on a bearing mounting portion 31a of the input shaft 31. It should be noted that the bearing mounting portion 31a has a columnar shape with a smaller diameter than the body portion of the input shaft 31, and a support step 31b (see FIG. 4) is provided between the bearing mounting portion 31a and the pinion gear 30. Further, the inner ring of the sixth ball bearing BB6 is abutted against the support step 31b from the other axial side via a second washer WS2 (see FIG. 11).

It should be noted that the second washer WS2 has a function of eliminating rattling between the sixth ball bearing BB6 and the input shaft 31 and rotating the input shaft 31 smoothly.

Here, an angular ball bearing is adopted as the sixth ball bearing BB6. Thereby, the sixth ball bearing BB6 presses the input shaft 31 to one axial side (lower side in the drawing) while receiving the axial force from the rattling adjustment member 68. As a result, the input shaft 31 is prevented from rattling between the fifth ball bearing BB5 and the sixth ball bearing BB6, and the quietness during operation of the planetary gear reduction mechanism 10 is improved.

It should be noted that the rattling adjustment member 68 is screwed to the through hole 66a, and moves to one axial side (lower side in the drawing) by turning the rattling adjustment member 68 clockwise. Further, the rattling adjustment member 68 presses the outer ring of the sixth ball bearing BB6 toward one axial side. On the other hand, the rattling adjustment member 68 moves to the other axial side (upper side in the drawing) by turning the rattling adjustment member 68 counterclockwise.

In addition, the inner ring of the first ball bearing BB1 is mounted on the radially outer side of the output side cylindrical portion 66, and the inner ring of the first ball bearing BB1 is abutted against a second stepped portion ST2 (see FIG. 7) between the cylindrical body portion 61 and the output side cylindrical portion 66 from the other axial side. Specifically, a third washer WS3 (see FIG. 10) is provided between the inner ring of the first ball bearing BB1 and the second stepped portion ST2, and the inner ring of the first ball bearing BB1 is abutted against the second stepped portion ST2 via the third washer WS3.

Furthermore, the second support shaft fixing hole 64b is provided at a location of the output side cylindrical portion 66 where the second pedestal 63b is provided so as to extend in the axial direction of the carrier 60. Three second support shaft fixing holes 64b are provided corresponding to the second pedestals 63b, and are arranged at equal intervals (120 degree intervals) in the circumferential direction of the cylindrical body portion 61. Further, the second support shaft fixing hole 64b passes through both the second pedestal 63b and the output side cylindrical portion 66, and the other axial side (upper side in the drawing) of the support shaft 52 that rotatably supports the planetary gear 50 is installed in the second support shaft fixing hole 64b.

Here, the support shaft 52 is inserted into the first support shaft fixing hole 64a without rattling, and is fixed into the second support shaft fixing hole 64b by press fitting. As a result, the load of inserting the support shaft 52 into the first and second support shaft fixing holes 64a and 64b when assembling the carrier assembly CA (see FIG. 9) is reduced, thereby improving the assemblability.

It should be noted that the first and second support shaft fixing holes 64a and 64b, to which both axial sides of the support shaft 52 are fixed, respectively correspond to the support shaft fixing holes in the disclosure.

In this way, a total of three second support shaft fixing holes 64b and a total of three first support shaft fixing holes 64a are arranged coaxially in the axial direction of the carrier 60, respectively. Here, the carrier 60 is formed with high accuracy, that is, without dimensional errors, by cutting an aluminum material. Therefore, as shown in FIG. 7, the rotation center C1 of the carrier 60 and the central axis C2 of the first and second support shaft fixing holes 64a and 64b

(rotation center of the planetary gears 50) arranged around the rotation center C1 are arranged at predetermined positions on the carrier 60 with high accuracy.

Further, a plurality of female screw portions 66*b* are provided on the other axial side (upper side in the drawing) of the output side cylindrical portion 66. These female screw portions 66*b* extend in the axial direction of the carrier 60. Further, a fixing screw (not shown) for fixing the shaft coupling 70 (see FIG. 1 to FIG. 3) is screwed into the female screw portion 66*b*. In addition, in order to ensure sufficient fixing strength, it is desirable to use at least three fixing screws to fix the shaft coupling 70 to the carrier 60.

[Shaft Coupling]

As shown in FIG. 1 to FIG. 3, the planetary gear reduction mechanism 10 includes the shaft coupling 70 that is connected to the drive mechanism (not shown) of the robot, which is the object to be driven, so as to be capable of transmitting power. It should be noted that, similar to the carrier 60, the shaft coupling 70 is also formed with high accuracy, that is, without dimensional errors, by cutting an aluminum material.

The shaft coupling 70 includes a fixed body portion 71 formed in a substantially disk shape, and the output shaft 72 that is integrally provided with the fixed body portion 71. Further, the fixed body portion 71 is fixed to the output side cylindrical portion 66 of the carrier 60. In addition, the output shaft 72 extends from the other axial side (upper side in the drawing) of the fixed body portion 71 toward the drive mechanism (not shown) of the robot, and has a substantially columnar shape.

It should be noted that the shaft coupling 70 is fixed to the carrier 60 and drives the drive mechanism (not shown) of the robot, and corresponds to the output side rotating body in the disclosure.

As shown in FIG. 1 and FIG. 3, the fixed body portion 71 is provided with a total of three fixing holes 71*a*. These fixing holes 71*a* are arranged at equal intervals (120 degree intervals) in the circumferential direction of the fixed body portion 71 with the output shaft 72 as the center. Further, a total of three fixing holes 71*a* are provided corresponding to a total of three second support shaft fixing holes 64*b* (see FIG. 7) provided in the output side cylindrical portion 66 of the carrier 60.

A fixing pin 73 made of steel is fixed to each of the three fixing holes 71*a* by press fitting. These fixing pins 73 are inserted into the respective fixing holes 71*a* from the other axial side (upper side in the drawing) of the shaft coupling 70, and one axial side (lower side in the drawing) of the fixing pin 73 is fixed to the second support shaft fixing hole 64*b* of the carrier 60 by press fitting. That is, the fixing pins 73 fixed to the fixed body portion 71 are respectively fixed to the second support shaft fixing holes 64*b*, and the shaft coupling 70 is fixed to the carrier 60 by the fixing pins 73.

In this way, the fixing pin 73 is press-fitted into both the fixing hole 71*a* and the second support shaft fixing hole 64*b*, and the fixing hole 71*a* corresponds to the fixing member fixing hole in the disclosure. That is, the fixing pin 73 has a function of fixing the shaft coupling 70 and the carrier 60, which are respectively formed (manufactured) with high accuracy, to each other. It should be noted that the fixing pin 73 corresponds to the fixing member in the disclosure.

Then, by press-fitting and fixing the fixing pin 73 into both the fixing hole 71*a* and the second support shaft fixing hole 64*b*, the shaft coupling 70 can be accurately positioned with respect to the carrier 60 and can be securely fixed to each other.

It should be noted that on one axial side of the fixing pin 73, a tapered portion 73*a* is formed in a tapered shape so as to be easily inserted into the fixing hole 71*a* and the second support shaft fixing hole 64*b*, respectively (improved assemblability).

Further, the fixed body portion 71 is provided with a plurality of screw insertion holes 71*b* into which fixing screws (not shown) for fixing the shaft coupling 70 to the carrier 60 are inserted. These screw insertion holes 71*b* are provided corresponding to a plurality of female screw portions 66*b* (see FIG. 7) provided in the output side cylindrical portion 66.

[Assembling Procedure]

Next, the procedure for assembling the planetary gear reduction mechanism 10 formed as described above will be described in detail using FIG. 8 to FIG. 12.

Figure 8:
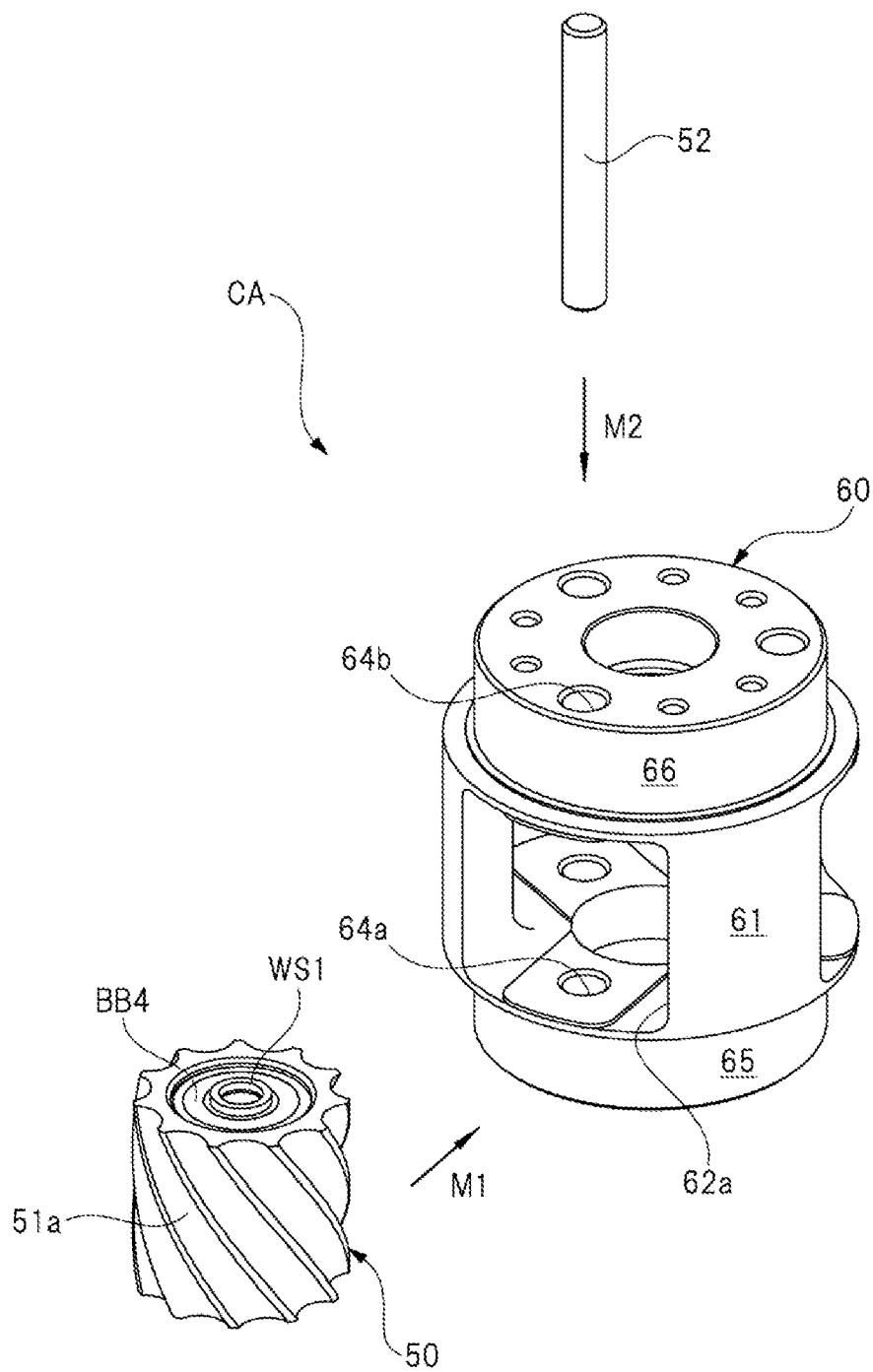
FIG. 8 is a perspective view showing the procedure for assembling the carrier assembly.
Figure 9:
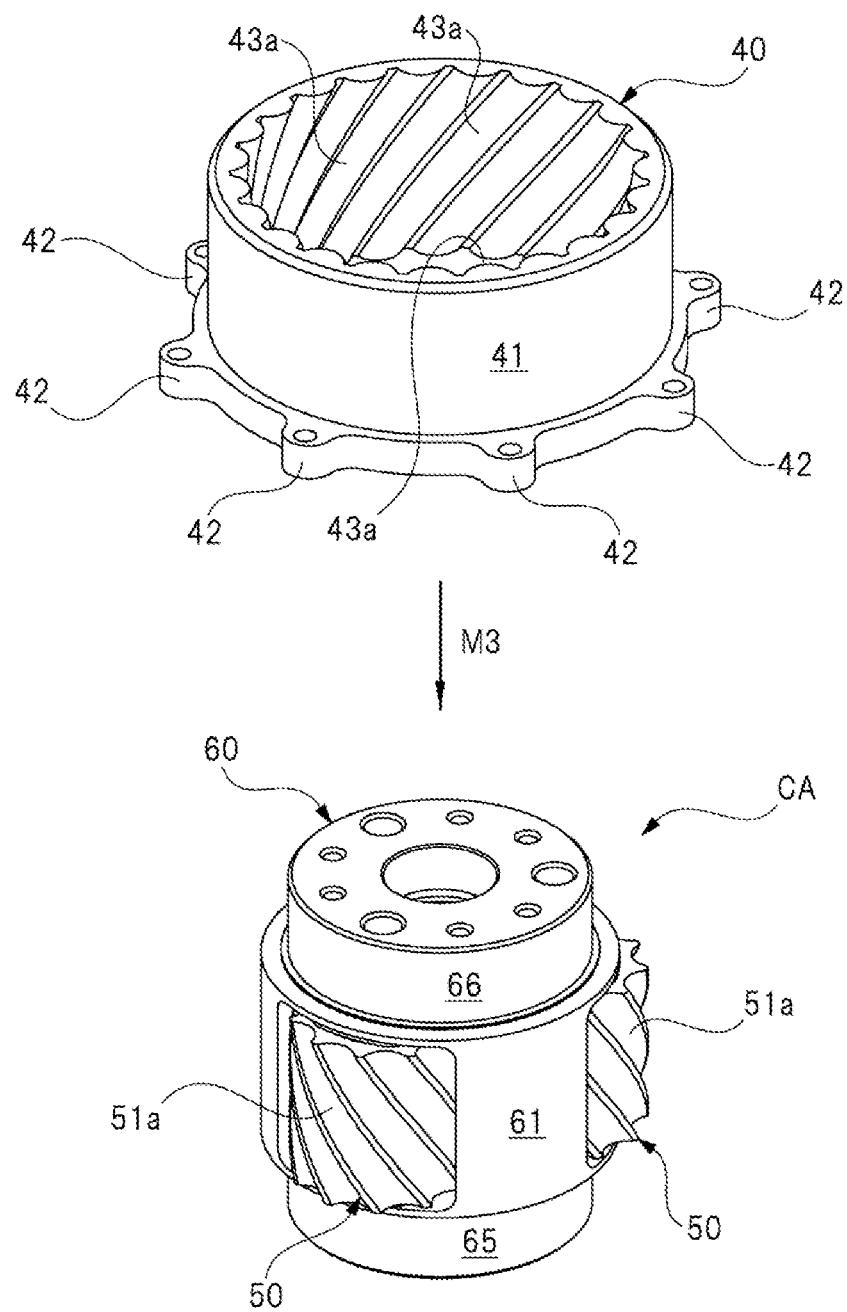
FIG. 9 is a perspective view showing the procedure for assembling the internal gear to the carrier assembly.
Figure 10:
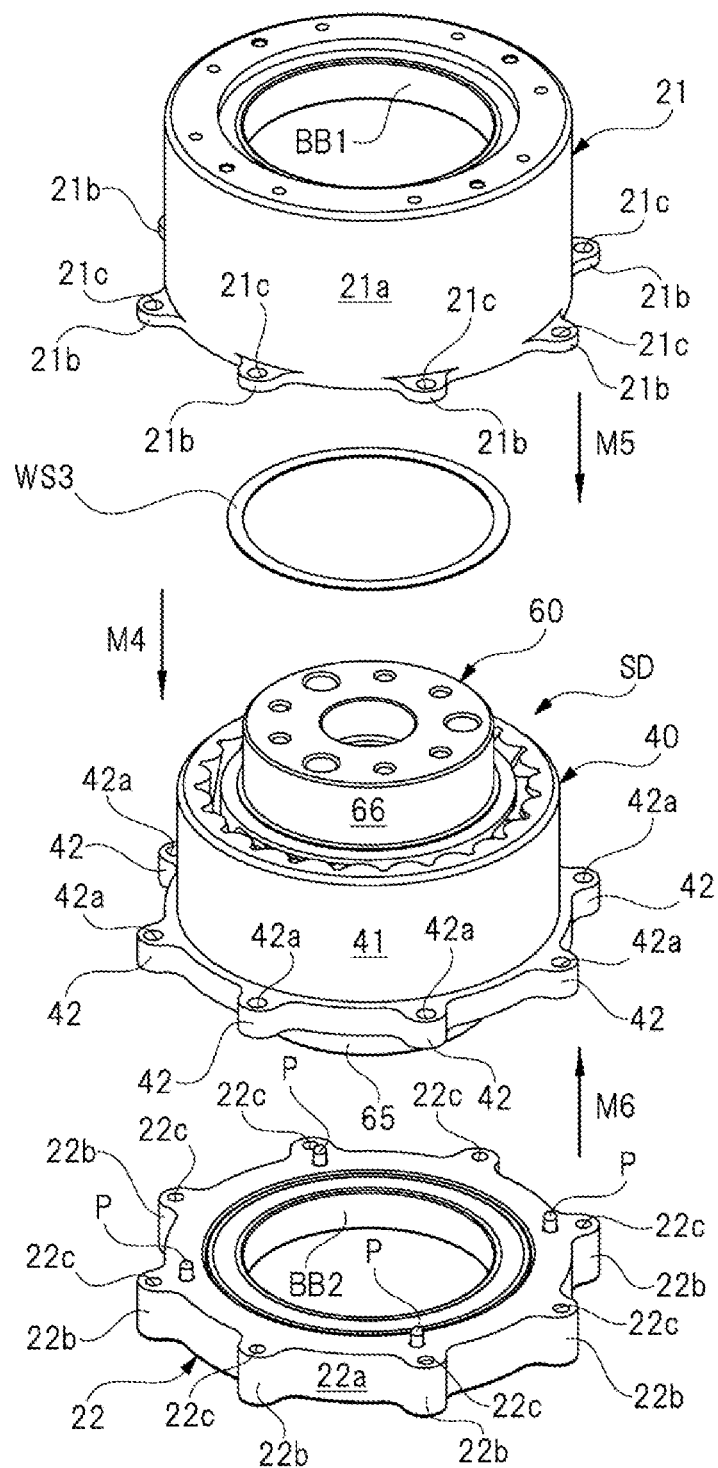
FIG. 10 is a perspective view showing the procedure for assembling the housing body and the ring member.
Figure 11:
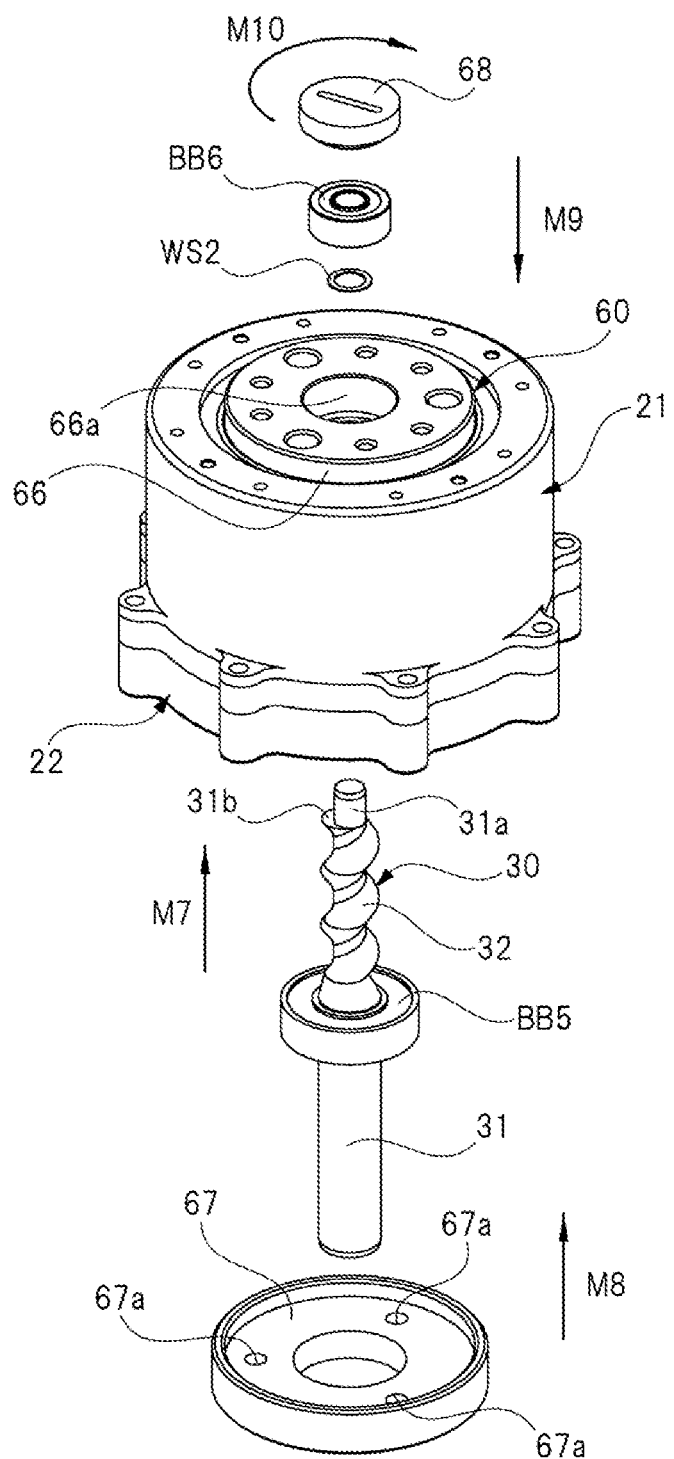
FIG. 11 is a perspective view showing the procedure for assembling the pinion gear and the rattling adjustment member.
Figure 12:
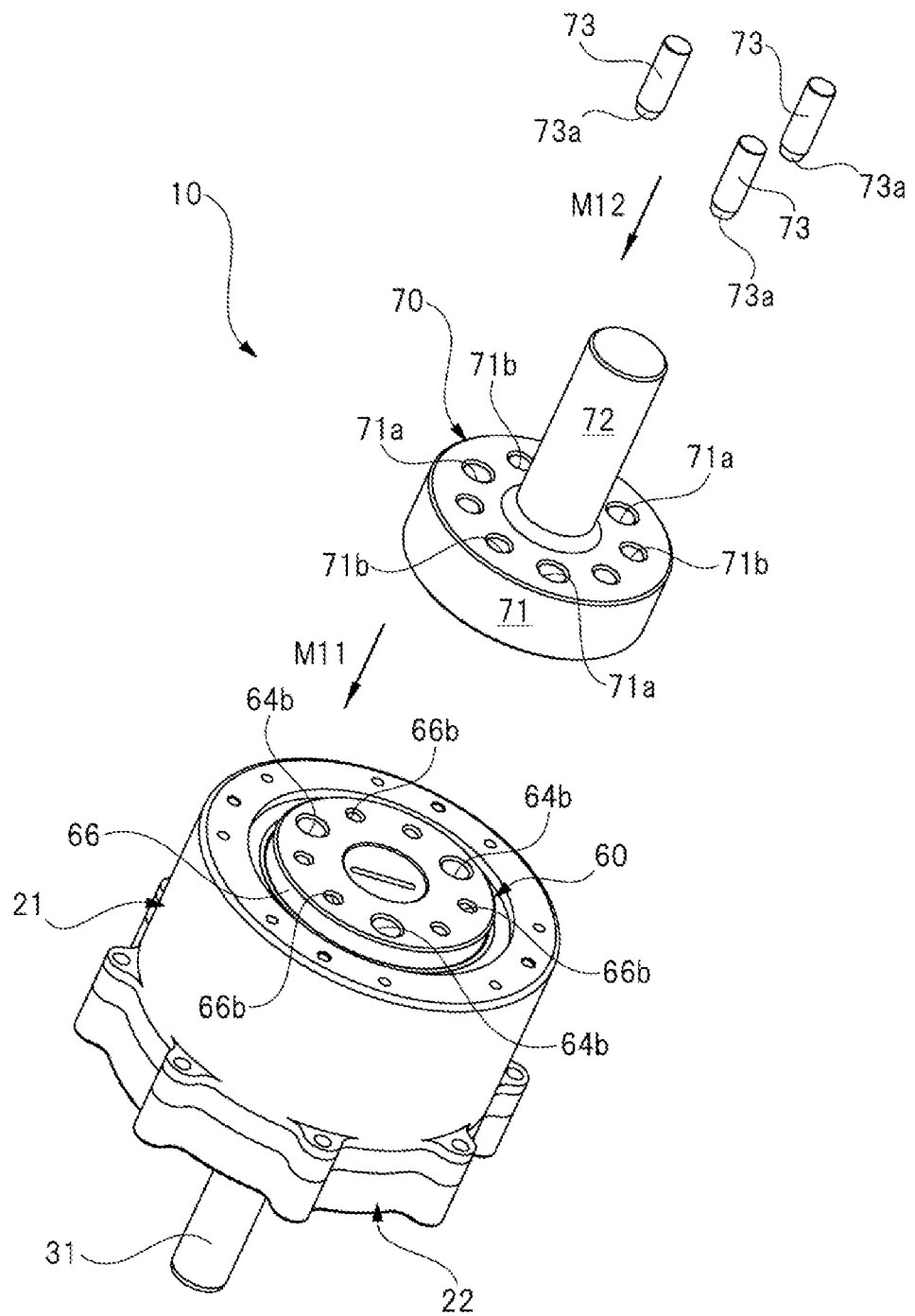
FIG. 12 is a perspective view showing the procedure for assembling the shaft coupling to the carrier.

FIG. 8 is a perspective view showing the procedure for assembling the carrier assembly, FIG. 9 is a perspective view showing the procedure for assembling the internal gear to the carrier assembly, FIG. 10 is a perspective view showing the procedure for assembling the housing body and the ring member, FIG. 11 is a perspective view showing the procedure for assembling the pinion gear and the rattling adjustment member, and FIG. 12 is a perspective view showing the procedure for assembling the shaft coupling to the carrier.

[Assembling of the Carrier Assembly]

As shown in FIG. 8, first, the carrier assembly CA is assembled. Specifically, the carrier 60, a total of three planetary gears 50, and a total of three support shafts 52 manufactured through another manufacturing process are prepared, respectively. It should be noted that in FIG. 8, one planetary gear 50 and one support shaft 52 are shown for ease of understanding.

Next, as indicated by the arrow M1 in FIG. 8, the planetary gear 50 is arranged to face the communication hole 62*a* from the radially outer side of the carrier 60. At this time, the third and fourth ball bearings BB3 and BB4 (see FIG. 3) are mounted in advance on the radially inner side of the planetary gear 50. In addition, the first washer WS1 is attached to each of the third and fourth ball bearings BB3 and BB4 (see FIG. 3).

Thereafter, the planetary gear 50 is inserted into the communication hole 62*a*, and the support shaft 52 is arranged to face the other axial side of the carrier 60, as indicated by the arrow M2 in FIG. 8. At this time, the input side cylindrical portion 65 of the carrier 60 is arranged on one axial side (lower side in the drawing), and the output side cylindrical portion 66 of the carrier 60 is arranged on the other axial side (upper side in the drawing).

Then, the support shaft 52 is inserted into the second support shaft fixing hole 64*b* and the first support shaft fixing hole 64*a* in this order. It should be noted that the support shaft 52 is inserted into the first support shaft fixing hole 64*a*, and the support shaft 52 is press-fitted into the second support shaft fixing hole 64*b*. Thus, the insertion load of the support shaft 52 does not need to be so large, and the carrier assembly CA can be easily assembled.

Thereafter, the work of attaching the planetary gear 50 to the communication hole 62*a* as described above is carried out twice in succession, thereby completing the work of assembling the carrier assembly CA (see FIG. 9).

[Assembling of the Internal Gear to the Carrier Assembly]

Next, as shown in FIG. 9, the internal gear 40 manufactured through another manufacturing process is prepared, and the work of assembling the internal gear 40 to the completed carrier assembly CA is carried out.

Specifically, the internal gear 40 is arranged to face the other axial side of the carrier assembly CA, that is, the side of the output side cylindrical portion 66 (upper side in the drawing), as indicated by the arrow M3 in the drawing. At this time, the side of the fourth flange portion 42 in the axial direction of the internal gear 40 is directed toward the carrier assembly CA.

Then, the internal gear 40 is disposed to cover the radially outer side of the carrier assembly CA. At this time, the planetary gear 50 of the carrier assembly CA is smoothly rotatable with respect to the carrier 60, and therefore, the internal teeth 43a of the internal gear 40 and the meshing recesses 51a of the planetary gear 50 mesh smoothly with each other.

Thereby, the work of assembling the internal gear 40 to the carrier assembly CA is completed.

[Assembling of the Housing Body and the Ring Member]

Next, as shown in FIG. 10, the housing body 21, the ring member 22, and the third washer WS3 manufactured through another manufacturing process are prepared. It should be noted that the first ball bearing BB1 is installed in advance in the housing body 21, and the second ball bearing BB2 is installed in advance in the ring member 22.

Thereafter, the third washer WS3 is attached to the output side cylindrical portion 66 of the carrier 60, as indicated by the arrow M4 in the drawing. Next, as indicated by the arrow M5 in the drawing, the housing body 21 is mounted so as to cover the radially outer side of the internal gear 40. At this time, the side of the first flange portion 21b of the housing body 21 in the axial direction is directed toward the internal gear 40.

Thereafter, the ring member 22 (second ball bearing BB2) is mounted on the input side cylindrical portion 65 of the carrier 60, as indicated by the arrow M6 in the drawing. At this time, the side of the ring member 22 on which the positioning protrusions P are provided faces the internal gear 40. Then, while the second ball bearing BB2 is attached to the input side cylindrical portion 65, the positioning protrusions P of the ring member 22 are engaged with the engagement recesses (not shown) of the internal gear 40.

Then, while a fixing bolt (not shown) is inserted into the insertion hole 21c of the first flange portion 21b and the insertion hole 42a of the fourth flange portion 42, the fixing bolt is screwed into the female screw hole 22c of the third flange portion 22b. Thereby, the speed reducer SD is housed inside the housing 20, and the assembly of the housing body 21 and the ring member 22 is completed.

[Assembling of the Pinion Gear and the Rattling Adjustment Member]

Next, as shown in FIG. 11, the input shaft 31 having the pinion gear 30 and the lid member 67 manufactured through another manufacturing process are prepared. It should be noted that the fifth ball bearing BB5 is fixed to the input shaft 31 in advance. In addition, the second washer WS2, the sixth ball bearing BB6, and the rattling adjustment member 68 are also prepared.

Thereafter, the pinion gear 30 is arranged to face the input side cylindrical portion 65 (see FIG. 3) of the carrier 60, as indicated by the arrow M7 in the drawing. Then, the pinion gear 30 is inserted between a total of three planetary gears 50 (see FIG. 6). At this time, the planetary gears 50 are smoothly rotatable with respect to the carrier 60. Thus, while the planetary gears 50 rotate, the spiral tooth 32 of the pinion gear 30 and the meshing recesses 51a (see FIG. 6) of the planetary gears 50 mesh smoothly with each other.

Then, the fifth ball bearing BB5 is installed in the insertion hole 65a (see FIG. 3) of the input side cylindrical portion 65. Further, as indicated by the arrow M8 in FIG. 11, the lid member 67 is fixed to the input side cylindrical portion 65 (see FIG. 3). At this time, a total of three fixing screws (not shown) are inserted into the screw insertion holes 67a of the lid member 67 and screwed into the screw holes 65b (see FIG. 3) of the input side cylindrical portion 65. Thereby, the input shaft 31 (pinion gear 30) is prevented from coming out of the carrier 60.

Next, as indicated by the arrow M9 in the drawing, the second washer WS2 is inserted into the through hole 66a of the output side cylindrical portion 66 and placed on the support step 31b of the input shaft 31. Thereafter, the sixth ball bearing BB6 is inserted into the through hole 66a of the output side cylindrical portion 66 and mounted on the bearing mounting portion 31a of the input shaft 31. Then, the rattling adjustment member 68 is screwed to the through hole 66a.

Then, as indicated by the arrow M10 in the drawing, the rattling adjustment member 68 is turned clockwise to press the outer ring of the sixth ball bearing BB6 toward one axial side. As a result, the input shaft 31 is prevented from rattling in the axial direction, and the work of assembling the pinion gear 30 and the rattling adjustment member 68 is completed.

[Assembling of the Shaft Coupling to the Carrier]

Next, as shown in FIG. 12, the shaft coupling 70 and a total of three fixing pins 73 manufactured through another manufacturing process are prepared.

Thereafter, as indicated by the arrow M11 in the drawing, the fixed body portion 71 of the shaft coupling 70 is arranged to face the output side cylindrical portion 66 of the carrier 60. At this time, a total of three fixing holes 71a provided in the fixed body portion 71, and a total of three second support shaft fixing holes 64b provided in the output side cylindrical portion 66 are placed in a state to be opposed to each other in the axial direction (arranged coaxially).

Next, as indicated by the arrow M12 in the drawing, a total of three fixing pins 73 are press-fitted into both the fixing holes 71a and the second support shaft fixing holes 64b in this order. At this time, the side of the fixing pin 73 on which the tapered portion 73a is provided is directed toward the fixed body portion 71.

Thereby, the shaft coupling 70 is accurately positioned with respect to the carrier 60 and is securely fixed. Next, the shaft coupling 70 is fixed to the carrier 60 using a plurality of fixing screws (not shown). At this time, an arbitrary screw insertion hole 71b among the plurality of screw insertion holes 71b of the fixed body portion 71 and an arbitrary female screw portion 66b among the plurality of female screw portions 66b of the output side cylindrical portion 66 are used. It should be noted that it is desirable to use three fixing screws for fixing the shaft coupling 70 to the carrier 60, also from the viewpoint of fixing strength.

As a result, the shaft coupling 70 does not come off the carrier 60 due to vibrations or the like during driving of the planetary gear reduction mechanism 10, and the assembly work of the planetary gear reduction mechanism 10 is finally completed.

As detailed above, according to the planetary gear reduction mechanism 10 of the first embodiment, the carrier 60 is provided with the first and second support shaft fixing holes 64a and 64b to which the support shafts 52 that rotatably support the planetary gears 50 are fixed, and the shaft coupling 70 is fixed to the carrier 60 by the fixing pins 73 fixed to the second support shaft fixing holes 64b.

Thus, the shaft coupling 70 can be accurately fixed to the carrier 60 formed with high processing accuracy. Therefore, it is possible to realize the planetary gear reduction mechanism 10 that is capable of accurately driving the drive mechanism of the robot, which is the object to be driven.

Furthermore, according to the planetary gear reduction mechanism 10 of the first embodiment, three planetary gears 50 are provided at equal intervals (120 degree intervals) in the circumferential direction of the pinion gear 30, and the shaft coupling 70 is fixed to the carrier 60 by three fixing pins 73.

Thereby, the pinion gear 30 can be held in a well-balanced manner by the three planetary gears 50. Therefore, it is possible to reduce the operating noise of the planetary gear reduction mechanism 10 and to efficiently transmit power from the pinion gear 30 to the three planetary gears 50. Furthermore, the shaft coupling 70 can be fixed to the carrier 60 at three points in a well-balanced manner using the three fixing pins 73.

Additionally, according to the planetary gear reduction mechanism 10 of the first embodiment, the fixing pins 73 are press-fitted into both the fixing holes 71a provided in the shaft coupling 70 and the second support shaft fixing holes 64b provided in the carrier 60.

Thereby, it is possible to securely fix the shaft coupling 70 to the carrier 60 without rattling.

Further, according to the planetary gear reduction mechanism 10 of the first embodiment, the pinion gear 30 has only one spiral tooth 32 that is spirally connected in the axial direction of the input shaft 31.

As a result, it is possible to increase the transmission efficiency of the gear, and also to obtain a large reduction ratio despite the small size. Therefore, it is possible to downsize and save power of the electric motor which is a drive source.

Moreover, according to the planetary gear reduction mechanism 10 of the first embodiment, the second support shaft fixing holes 64b provided in the carrier 60 are used to support the fixing pins 73 in addition to supporting the support shafts 52. That is, there is no need to newly provide a support structure for supporting the fixing pins 73, and the energy required for manufacturing the planetary gear reduction mechanism 10 can be saved. Therefore, Goal 7 (ensure access to affordable, reliable, sustainable and modern energy for all) and Goal 13 (take urgent action to combat climate change and its impacts) in the United Nations Sustainable Development Goals (SDGs) can be achieved.

Second Embodiment

Next, the second embodiment of the disclosure will be described in detail using the drawings. It should be noted that parts having the same functions as those in the first embodiment are given the same symbols, and detailed description thereof will be omitted.

Figure 13:
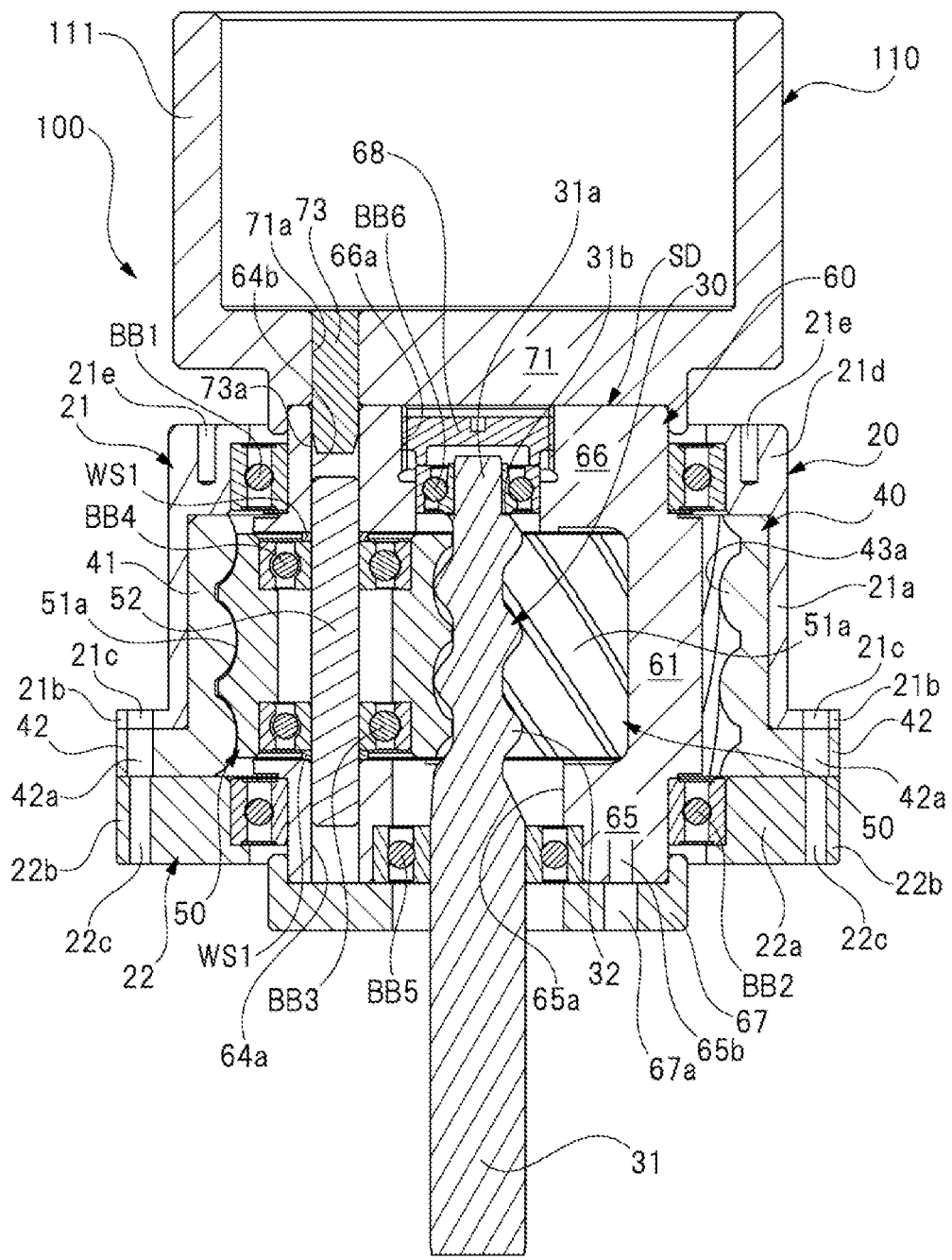
FIG. 13 is a cross-sectional view corresponding to FIG. 3 showing the planetary gear reduction mechanism of the second embodiment.

FIG. 13 is a cross-sectional view corresponding to FIG. 3 showing the planetary gear reduction mechanism of the second embodiment.

As shown in FIG. 13, the planetary gear reduction mechanism 100 of the second embodiment differs from the planetary gear reduction mechanism 10 of the first embodiment (see FIG. 3) only in the shape of the shaft coupling (output side rotating body) 110.

The shaft coupling 110 includes a fixed body portion 71 formed in a substantially disk shape, and an output shaft 111 provided integrally with the fixed body portion 71 and formed in a substantially cylindrical shape. That is, while the fixed body portion 71 is provided with the substantially columnar output shaft 72 in the first embodiment as shown in FIG. 3, the fixed body portion 71 is provided with the substantially cylindrical output shaft 111 in the second embodiment as shown in FIG. 13.

The second embodiment formed as described above can also achieve the same effects as the first embodiment.

As in the first embodiment (planetary gear reduction mechanism 10) and the second embodiment (planetary gear reduction mechanism 100) described above, the shapes of the output shafts 72 and 111 provided in the shaft couplings 70 and 110 may be arbitrarily set in accordance with the shapes of the drive mechanism of the robot and other drive mechanisms, that is, the shape of the object to be driven.

It goes without saying that the disclosure is not limited to the embodiments described above, and can be modified in various ways without departing from the spirit thereof. For example, in each of the above embodiments, the six bearings in total are the first to sixth ball bearings BB1 to BB6, but the disclosure is not limited thereto, and some of the bearings may be replaced with bushes or bearings also called metals.

Further, in each of the above embodiments, a total of three planetary gears 50 are provided, but the disclosure is not limited thereto, and four or more planetary gears 50 may be provided. It should be noted that if there are two planetary gears 50 (an even number), the planetary gears 50 are arranged 180 degrees opposite to each other, which makes it difficult to hold the pinion gear 30 in a well-balanced manner and results in an increase in operating noise and a decrease in power transmission efficiency. On the other hand, if there are five or more planetary gears 50, the assemblability may be impaired or the structure may become larger. Therefore, when used in applications such as the above-described embodiments, it is desirable that the number of planetary gears 50 is three (an odd number).

Furthermore, it goes without saying that the above-described assembly procedure of the planetary gear reduction mechanism 10 is merely one example of many assembly procedures, and other assembly procedures may be used as well. For example, "assembling of the pinion gear 30 and the rattling adjustment member 68" shown in FIG. 11 may also be performed before "assembling of the housing body 21 and the ring member 22" shown in FIG. 10.

In addition, the material, shape, size, number, installation location, etc. of each component in each of the above-mentioned embodiments are arbitrary as long as the disclosure can be achieved, and are not limited to each of the above-mentioned embodiments.

What is claimed is:
1. A planetary gear reduction mechanism having a plurality of gears, comprising:
an input side rotating body connected to a drive source so as to be capable of transmitting power;
a sun gear provided on the input side rotating body;
an internal gear disposed on a radially outer side of the sun gear;
a planetary gear disposed between the sun gear and the internal gear;
a planetary carrier rotatably supporting the planetary gear; and
an output side rotating body fixed to the planetary carrier and driving an object to be driven,
wherein the planetary carrier comprises a support shaft fixing hole to which a support shaft that rotatably supports the planetary gear is fixed, and
the output side rotating body is fixed to the planetary carrier by a fixing member fixed to the support shaft fixing hole, wherein the fixing member is press-fitted into the support shaft fixing hole provided in the planetary carrier.

2. The planetary gear reduction mechanism according to claim 1, wherein at least three planetary gears are provided at equal intervals in a circumferential direction of the sun gear, and the output side rotating body is fixed to the planetary carrier by at least three fixing members.

3. The planetary gear reduction mechanism according to claim 1, wherein the fixing member is press-fitted into a fixing member fixing hole provided in the output side rotating body.

4. The planetary gear reduction mechanism according to claim 1, wherein the sun gear comprises only one tooth spirally connected in an axial direction of the input side rotating body.

5. The planetary gear reduction mechanism according to claim 2, wherein the sun gear comprises only one tooth spirally connected in an axial direction of the input side rotating body.

6. The planetary gear reduction mechanism according to claim 3, wherein the sun gear comprises only one tooth spirally connected in an axial direction of the input side rotating body.

* * * * *